United States Patent
Goto et al.

(10) Patent No.: US 9,219,381 B2
(45) Date of Patent: Dec. 22, 2015

(54) CHARGING SYSTEM, CONTROL METHOD THEREOF, AND PROGRAM

(75) Inventors: Mitsufumi Goto, Tokyo (JP); Masami Miura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 854 days.

(21) Appl. No.: 13/389,195

(22) PCT Filed: Feb. 25, 2011

(86) PCT No.: PCT/JP2011/054316
§ 371 (c)(1),
(2), (4) Date: Apr. 9, 2012

(87) PCT Pub. No.: WO2011/105555
PCT Pub. Date: Sep. 1, 2011

(65) Prior Publication Data
US 2012/0293108 A1    Nov. 22, 2012

(30) Foreign Application Priority Data

Feb. 26, 2010  (JP) .................................. 2014-041915

(51) Int. Cl.
| | |
|---|---|
| H02J 7/00 | (2006.01) |
| H01M 10/44 | (2006.01) |
| H01M 10/46 | (2006.01) |
| H02J 1/00 | (2006.01) |
| H02J 3/00 | (2006.01) |

(Continued)

(52) U.S. Cl.
CPC ............... *H02J 7/35* (2013.01); *H01M 10/441* (2013.01); *H01M 10/46* (2013.01); *H02J 7/34* (2013.01); *H01M 10/465* (2013.01); *H02J 3/383* (2013.01); *H02J 3/386* (2013.01); *H02J 2007/0095* (2013.01); *Y02E 10/563* (2013.01); *Y02E 10/566* (2013.01); *Y02E 10/763* (2013.01); *Y02E 10/766* (2013.01)

(58) Field of Classification Search
USPC .............. 320/101, 134; 324/427, 434; 307/80
See application file for complete search history.

(56) References Cited

U.S. PATENT DOCUMENTS

| | | | |
|---|---|---|---|
| 5,931,245 A * | 8/1999 | Uetake et al. ................ | 180/65.8 |
| 6,194,793 B1 * | 2/2001 | Fisher, Jr. ...................... | 307/66 |
| 2009/0016730 A1 * | 1/2009 | Ko ................................ | 398/116 |

FOREIGN PATENT DOCUMENTS

| | | |
|---|---|---|
| CN | 1167464 A | 12/1997 |
| JP | 2001-45677 A | 2/2001 |

(Continued)

OTHER PUBLICATIONS

Korean Office Action dated Aug. 31, 2013, issued in corresponding Korean Patent Application No. 10-2012-7003180 with English translatioon (6 pages).

(Continued)

*Primary Examiner* — Richard Isla Rodas
*Assistant Examiner* — David V Henze-Gongola
(74) *Attorney, Agent, or Firm* — Westerman, Hattori, Daniels & Adrian, LLP

(57) ABSTRACT

A power generating unit generates electric power using natural energy, plural secondary battery packs are charged with the electric power generated by the power generating unit, and the secondary battery pack as a power source to be used for an operation control of a control unit controlling the operation of a charging system is selected on the basis of a state of charge of the corresponding secondary battery pack.

5 Claims, 6 Drawing Sheets

(51) Int. Cl.
*G01N 27/416* (2006.01)
*H02J 7/35* (2006.01)
*H02J 7/34* (2006.01)
*H02J 3/38* (2006.01)

(56) References Cited

FOREIGN PATENT DOCUMENTS

| | | |
|---|---|---|
| JP | 2009-142150 A | 6/2009 |
| JP | 2010-41915 A | 2/2010 |
| KR | 10-0332038 B1 | 9/2002 |
| WO | 97/10967 A1 | 3/1997 |

OTHER PUBLICATIONS

Chinese Office Action dated Sep. 18, 2013, issued in corresponding Chinese Patent Application No. 201180003174.8 with English translation (9 pages).
International Search Report of PCT/JP2006/309012, date of mailing Apr. 26, 2011.
Written Opinion of the International Searching Authority dated Apr. 26, 2011, issued in International Application No. PCT/JP2011/054316.
International Search Report of PCT/JP2011/054316, date of mailing Apr. 26, 2011.

* cited by examiner

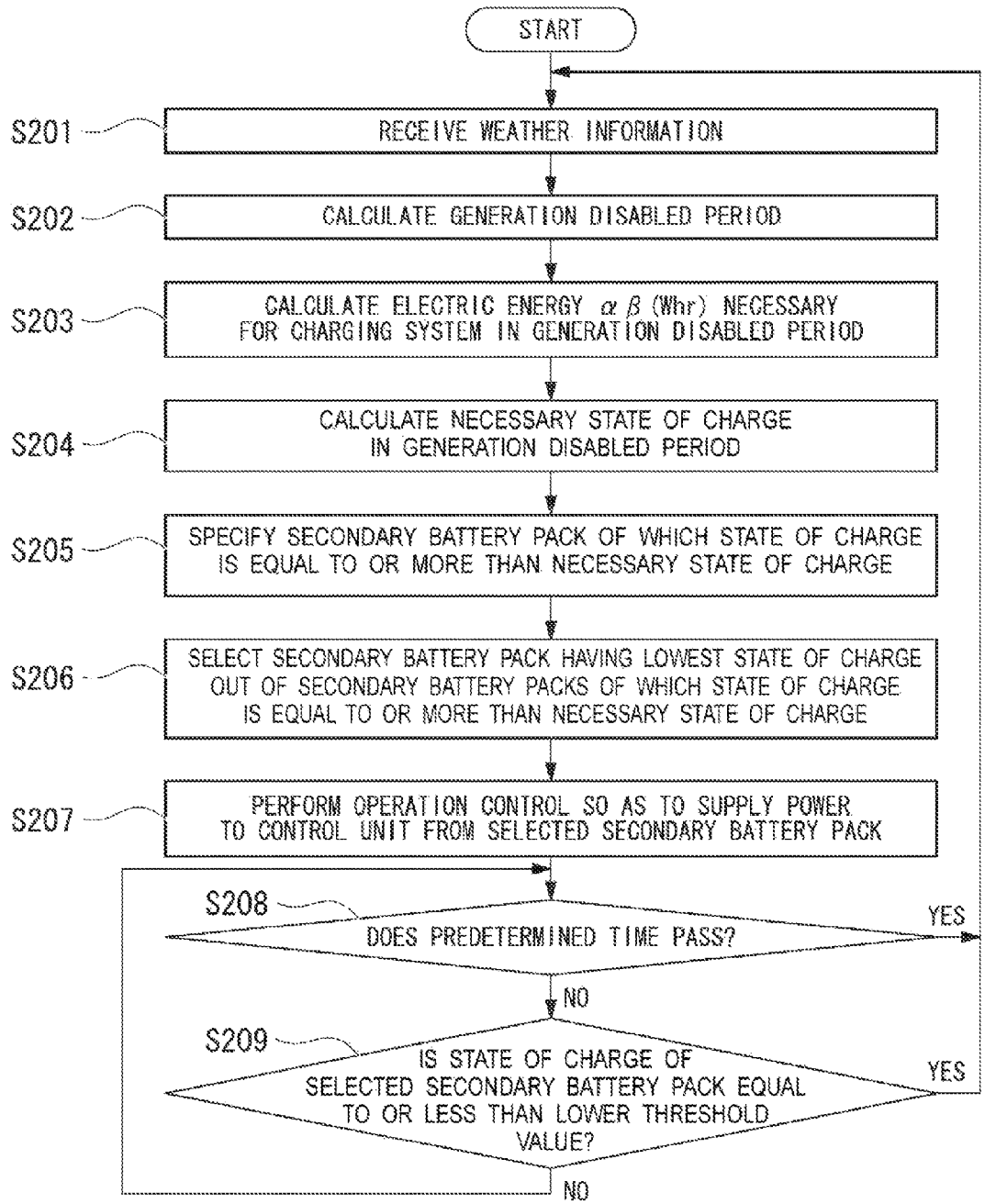

CHARGING SYSTEM, CONTROL METHOD THEREOF, AND PROGRAM

TECHNICAL FIELD

The present invention relates to a charging system charging a secondary battery, a control method thereof, and a program.

Priority is claimed on Japanese Patent Application No. 2010-41915, filed Feb. 26, 2010, the content of which is incorporated herein by reference.

BACKGROUND ART

An independent power source type charging system including a power generating unit using natural energy such as sunlight or wind, a cartridge type (removable) secondary battery pack being charged with power generated by the power generating unit, an electric power load such as an illumination lamp or a display used in the charging system, and a control unit controlling the operation of the whole charging system has been proposed. As described above, it is preferable that the independent power source type charging system can operate independently without any supply of power from another place by controlling the operation of the whole charging system by the use of power generated by the power generating unit using natural energy. However, since the power generating unit based on natural energy generation varies in power generation depending on presence of wind, weather, or time zone, the supply of power is not stable and the operation control of the control unit is affected, thereby destabilizing the operation of the whole charging system. For example, at night and when there is no wind, the power generation is disabled in both solar power generation and wind power generation, thereby disabling the operation control of the electric power load.

A technique of charging a secondary battery pack is disclosed in Patent Document 1.

PRIOR ART DOCUMENT

Patent Document

Patent Document 1: Japanese Published Unexamined Patent Application JP-A-2009-142150

SUMMARY OF INVENTION

Problem to be Solved by the Invention

Here, to improve the stability in a supply of power to a control unit, it can be considered that a small-capacity storage battery for the control unit is provided and power is supplied to the control unit from the small-capacity storage battery. In this case, it is necessary to provide a storage battery, a circuit supplying power to the control unit from the storage battery, and the like, thereby causing the cost of manufacturing the charging system to increase.

It is possible to cause the small-capacity storage battery to be unnecessary and thus to suppress an increase in cost of manufacturing the charging system, by supplying the power for the control unit from a cartridge type secondary battery pack as means for improving the stability of the supply of power for operation control to the control unit. However, in this method, when the cartridge type secondary battery pack is detached from the charging system and is used for another application (for example, when the secondary battery pack is mounted on a vehicle or the like), the secondary battery pack supplying power to the control unit is not present in the charging system. Accordingly, when the secondary battery pack is detached from the charging system, the charging system relies on the supply of power from the power generating unit using natural energy to the control unit and thus the supply of power to the control unit becomes unstable.

Therefore, an object of the invention is to provide a charging system that has a power generating unit supplying a removable secondary battery pack with power generated using natural energy and that can safely supply power to a control unit performing an operation control of the system without an increase in cost, a control method thereof, and a program thereof.

Means for Solving the Problem

According to one aspect of the invention, there is provided a charging system charging a plurality of secondary batteries, including: a power generating unit generating electric power using natural energy; a control unit controlling an operation of the charging system; a plurality of secondary battery packs being charged with the electric power generated by the power generating unit; and a control power source selecting unit selecting the secondary battery pack as a power source to be used for the operation control.

In the charging system according to one aspect of the invention, the control power source selecting unit may select the secondary battery pack as the power source to be used for the operation control on the basis of the state of charge of the plurality of secondary battery packs.

In the charging system according to one aspect of the invention, the control power source selecting unit may select the secondary battery pack of which the state of charge is the lowest out of the secondary battery packs of which the state of charge is equal to or more than a lower threshold value of the state of charge as the secondary battery pack of the power source to be used for the operation control.

The charging system according to one aspect of the invention may further include an electric energy determining unit determining whether electric power calculated on the basis of a generation disabled period of the power generating unit specified on the basis of weather information and power to be used for the operation control of the control unit in the generation disabled period can be supplied from each of the secondary battery packs on the basis of the state of charge of the corresponding secondary battery pack, and the control power source selecting unit may select the secondary battery pack that can supply the calculated electric power through the determination as the secondary battery pack of the power source to be used for the operation control.

According to another aspect of the invention, there is provided a control method of a charging system charging a plurality of secondary battery packs, including: generating electric power using natural energy by a power generating unit of the charging system; charging the plurality of secondary battery packs of the charging system with the electric power generated by the power generating unit; and selecting the secondary battery pack as a power source to be used for the operation control of a control unit controlling the operation of the charging system by a control power source selecting unit of the charging system.

That is, the control method according to another aspect of the invention includes: a step of generating electric power using natural energy by a power generating unit of the charging system; a step of charging the plurality of secondary battery packs of the charging system with the electric power generated by the power generating unit; and a step of selecting the secondary battery pack as a power source to be used for the operation control of a control unit controlling the operation of the charging system by a control power source selecting unit of the charging system.

According to still another aspect of the invention, there is provided a program causing a control unit of a charging system, which includes a power generating unit generating electric power using natural energy and a plurality of secondary battery packs being charged with the electric power generated by the power generating unit, to serve as control power source selecting means for selecting the secondary battery pack as a power source to be used for an operation control of the control unit controlling the operation of the charging system.

Effect of Invention

According to the present invention, it is possible to guarantee power for controlling the operation of the charging system 1 for a predetermined period of time in which it is known that electric power cannot be generated from natural energy by supplying the control unit 10 of the charging system 1 with power from a secondary battery pack 20 of which state of charge is equal to or more than a lower threshold value of the state of charge. Accordingly, it is possible to provide a charging system 1 that can stably supply power to the control unit 10 controlling the operation of the charging system 1 including a power generating unit 30 supplying power generated from natural energy to a removable secondary battery pack 20 without an increase in cost.

BRIEF DESCRIPTION OF THE DRAWINGS

FIG. 7 is a second diagram illustrating a process flow of the charging system.

MODE FOR CARRYING OUT THE INVENTION

First Embodiment

Hereinafter, a charging system according to a first embodiment of the present invention will be described with reference to the accompanying drawings.

Figure 1:
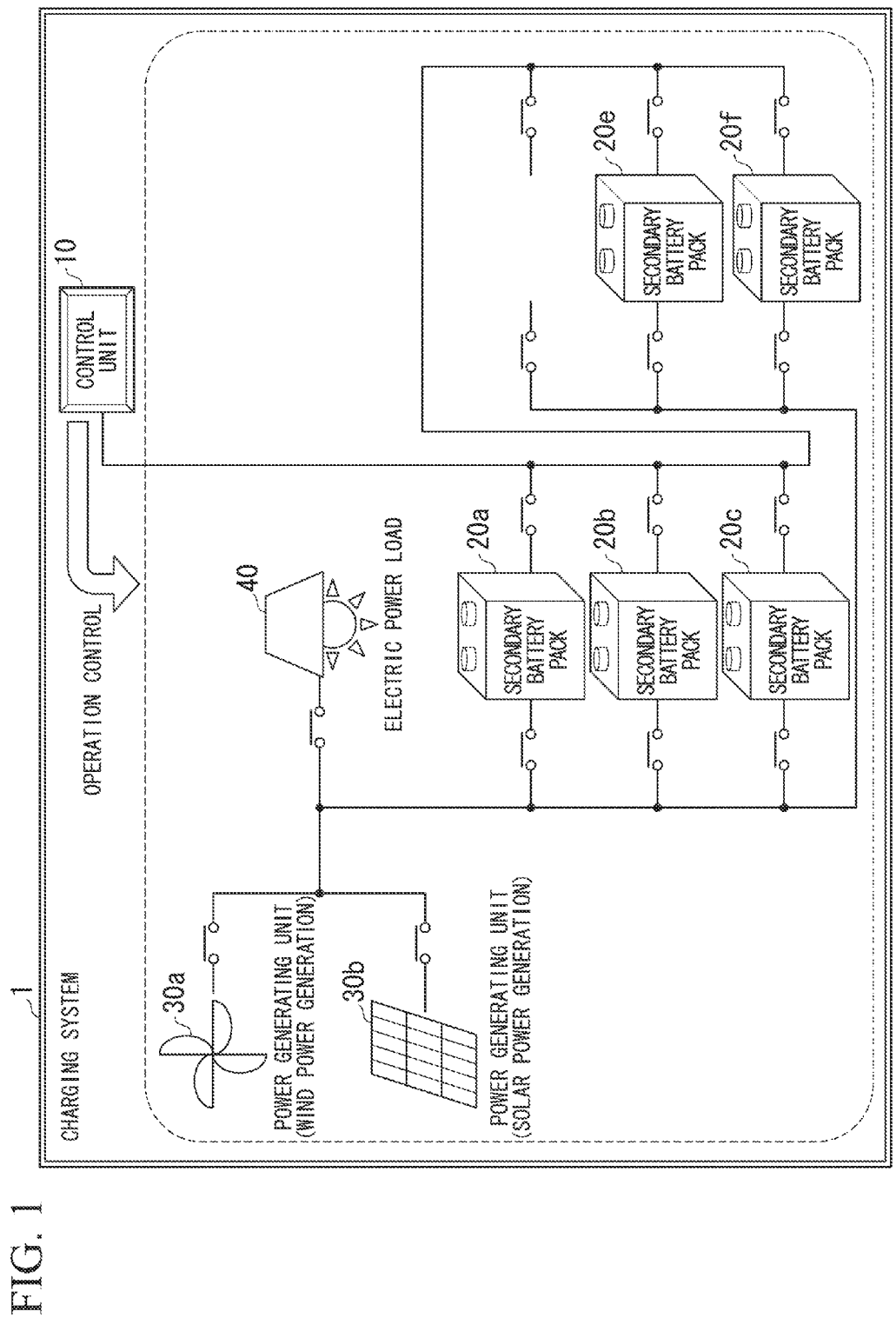
FIG. 1 is a diagram illustrating the concept of a charging system.

FIG. 1 is a diagram illustrating the concept of the charging system according to the first embodiment of the present invention.

In the drawing, reference numeral 1 denotes a charging system. In the present embodiment, the charging system 1 charges secondary battery packs 20a to 20f (hereinafter, generically referred to as secondary battery packs 20) through the use of power generating units 30a and 30b (hereinafter, generically referred to as power generating units 30) generating electric power using natural energy such as wind power generation or solar power generation. The charging system 1 includes a control unit 10 controlling the operation of an illumination lamp or an electrical power load 40 of the charging system 1.

Here, the power generating units 30 are connected to the electric power load 40 or the secondary battery packs 20 via power supply lines and the control unit 10 is connected to the secondary battery packs 20 via signal lines and power supply lines. The charging system 1 according to the present embodiment includes a cartridge type mechanism that can remove a secondary battery pack 20 or the like which is fully charged (with a state of charge of 100%) out of the secondary battery packs 20 from the charging system 1. The removed secondary battery pack 20 is used, for example, as a secondary battery pack 20 for a battery of a vehicle. In the charging system 1 according to the present embodiment, a secondary battery pack 20 of which the state of charge is lowered due to the use of the secondary battery pack 20 is attached again thereto and the secondary battery pack 20 is recharged through the use of the generation of the power generating units 30 using natural energy.

Figure 2:
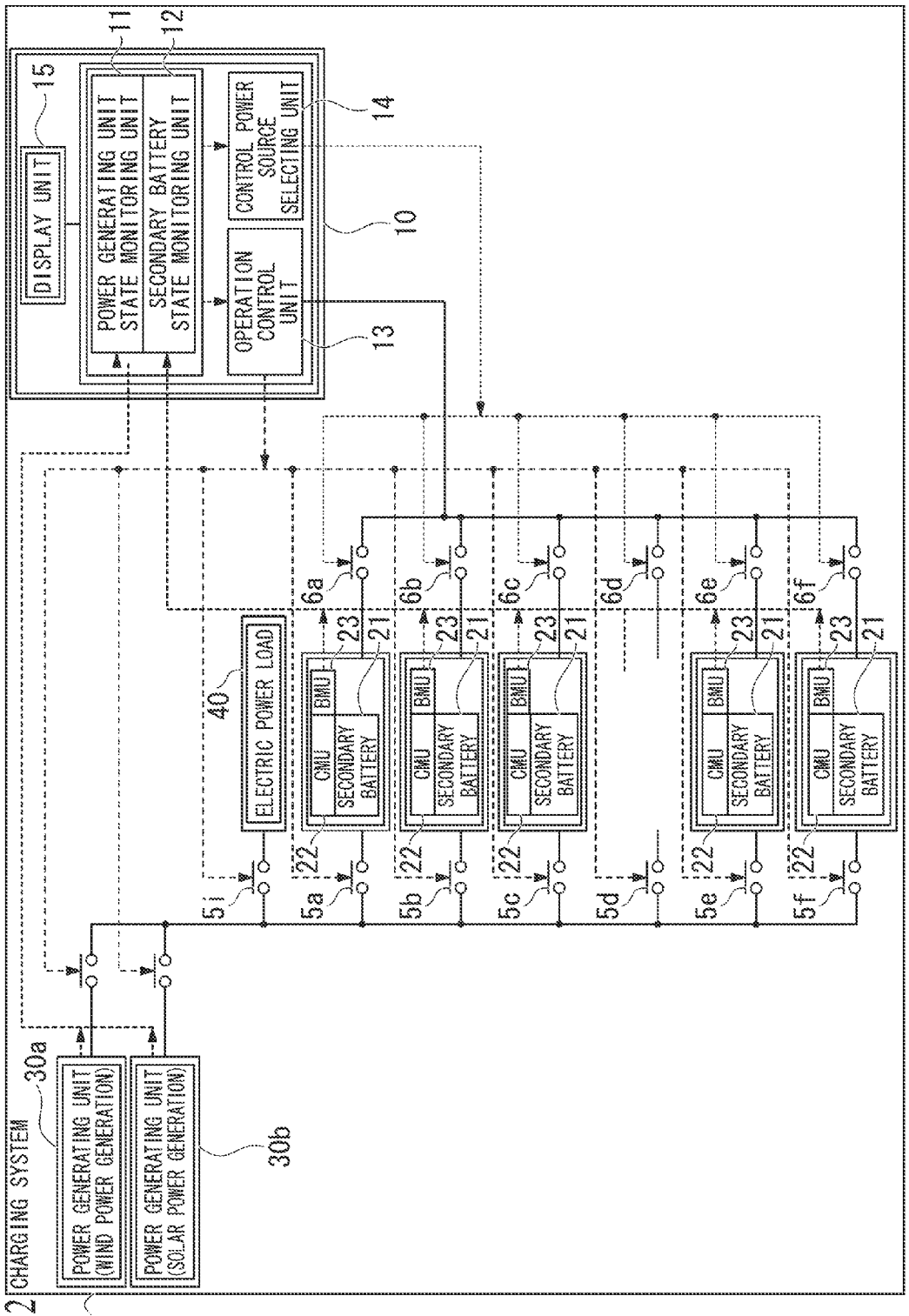
FIG. 2 is a functional block diagram illustrating the charging system.

FIG. 2 is a functional block diagram illustrating the charging system according to the first embodiment.

The functional configuration of the charging system 1 will be described below in detail with reference to FIG. 2.

The control unit 10 performs an operation control of the charging system 1 as described above and includes a power generating unit state monitoring unit 11, a secondary battery state monitoring unit 12, an operation control unit 13, a control power source selecting unit 14, and a display unit 15.

Each secondary battery pack 20 includes a secondary battery 21, a CMU (Cell Monitor Unit) 22, and a BMU (Battery Management Unit) 23.

The CMU 22 monitors the states of the secondary battery 21 such as the voltage and temperature of the secondary battery 21 and outputs state monitoring information of the secondary battery 21 to the BMU 23.

The BMU 23 performs processes such as calculation of the state of charge of the secondary battery 21 and outputting of the state of charge of the secondary battery 21 to the control unit 10 on the basis of the state monitoring information of the secondary battery 21 received from the CMU 22.

Switches 5a to 5f turn on and off connection states of power supply lines connecting the secondary battery packs 20 to the power generating unit 30. Switches 6a to 6f turn on and off connection states of power supply lines connecting the secondary battery packs 20 to the control units 10. Switches 5g and 5h turn on and off connection states of power supply lines connecting the secondary battery packs 20 to the power generating unit 30a and the power generating unit 30b. A switch 5i turns on and off connection state of a power supply line connecting the electric power load 40 to the power generating units 30. The switches 5a to 5i (hereinafter, collectively referred to as switches 5) and the switches 6a to 6f (hereinafter, collectively referred to as switches 6) are connected to the control unit 10 via signal lines for allowing the control unit 10 to control the ON and OFF states thereof.

In the charging system 1 according to the present embodiment, the control unit 10 controlling the operation of the charging system performs a process of selecting one secondary battery pack 20 as a power source for supplying power to be used for the operation control. In the process of selecting the secondary battery pack 20 as a power source to be used for the operation control, the charging system 1 selects one secondary battery pack 20 as a power source to be used for the operation control on the basis of the state of charge of the secondary battery packs 20. For example, the charging system 1 selects a secondary battery pack 20 of which the state of charge is the lowest out of the secondary battery packs 20 of which the state of charge is equal to or more than the lower threshold value of the state of charge as the secondary battery pack 20 which functions as a power source to be used for the operation control. Alternatively, a secondary battery pack 20 which can supply electric energy to be used for the operation control of the charging system 1 in a generation disabled period of the power generating units 30 is selected as the secondary battery pack 20 which functions as the power source to be used for the operation control.

Through these processes, it is possible to provide a charging system 1 which can stably supply electric power to the control unit 10 controlling the operation of the charging system 1 without an increase in cost, wherein the charging system 1 includes the power generating unit 30 supplying a removable secondary battery pack 20 with the electric power generated using natural energy.

The flow of processes of the above-mentioned charging system will be below sequentially described with reference to FIGS. 3 and 4.

Figure 3:
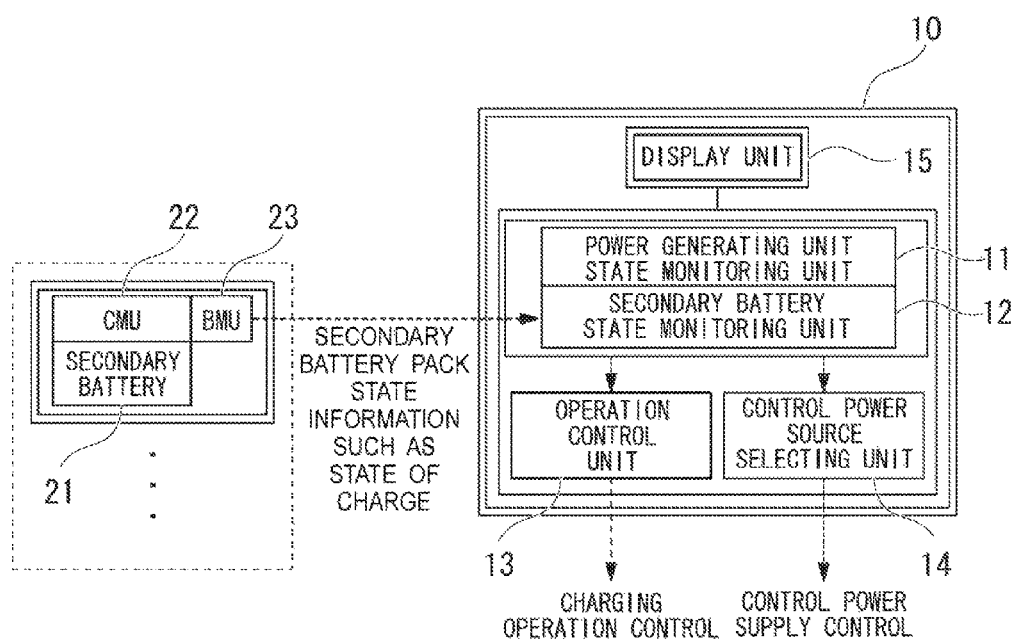
FIG. 3 is a first diagram illustrating functional blocks of a BMU.
Figure 4:
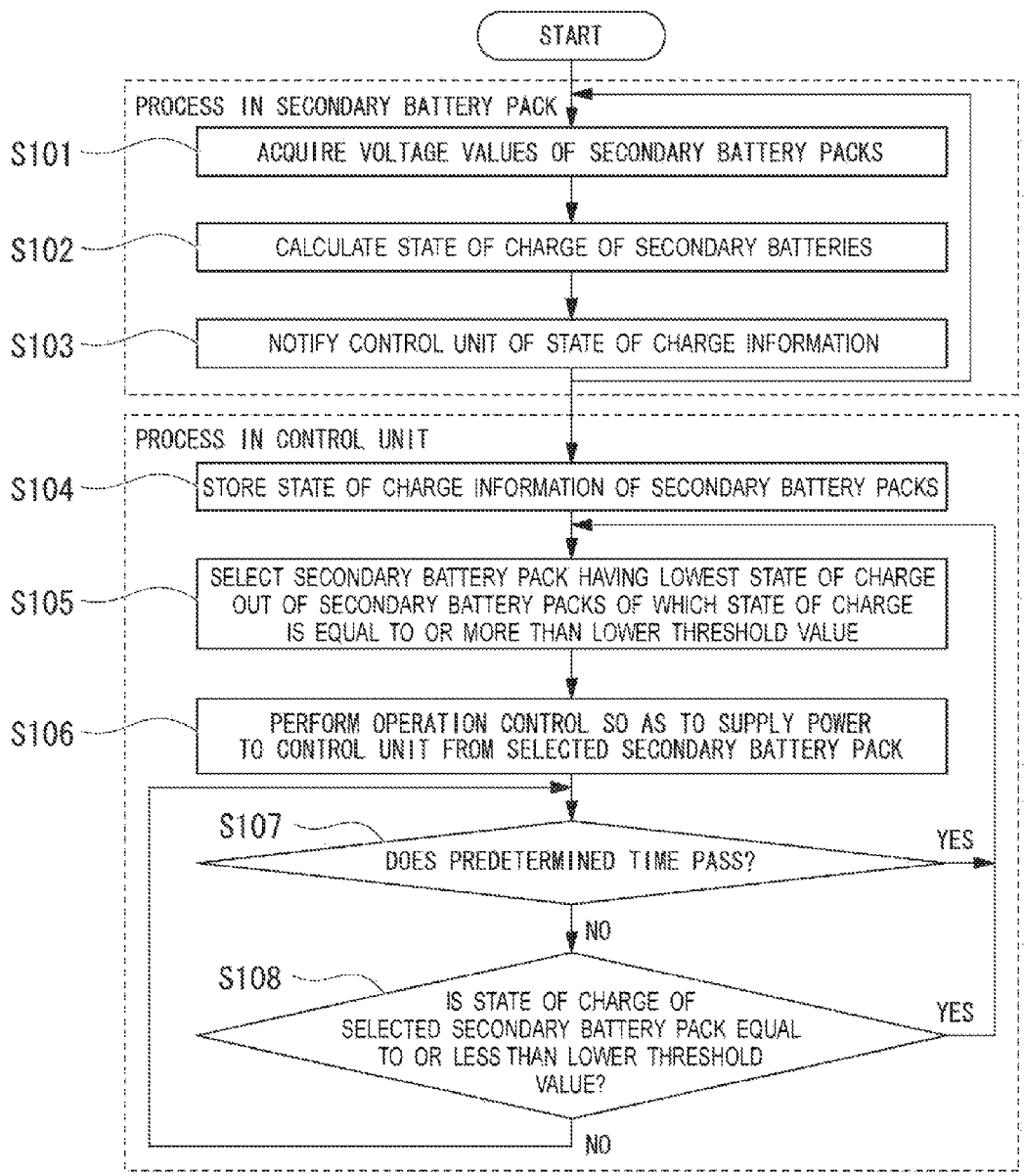
FIG. 4 is a first diagram illustrating a process flow of the charging system.

FIG. 3 is a first diagram illustrating functional blocks of the control unit 10. FIG. 4 is a first diagram illustrating the flow of processes of the charging system 1.

As shown in FIG. 3, the control unit 10 includes at least a secondary battery state monitoring unit 12, a control power source selecting unit 14, and an operation control unit 13. The secondary battery state monitoring unit 12 monitors and stores state of charge of the secondary battery packs 20 and information necessary for other processes. The control power source selecting unit 14 selects a secondary battery pack 20 as a power source to be use for the operation control. The operation control unit 13 performs an operation control such as a power supply control from the selected secondary battery pack 20 to the control unit 10.

First, in each battery pack, the BMU 23 acquires the voltage value of the secondary battery 21 via the CMU 22 (step S101). The BMU 23 calculates the state of charge of the secondary battery pack 20 on the basis of the acquired voltage value of the secondary battery 21 (step S102). Regarding the method of calculating the state of charge, the state of charge corresponding to the present voltage value of the secondary battery pack 20 is calculated by interpolation, for example, on the basis of information of a state of charge calculation table including state of charge corresponding to the voltage values of the secondary batteries 21. Otherwise, the BMU 23 may calculate the state of charge through the use of any method, as long as it can calculate the state of charge. The BMU 23 notifies the secondary batter state monitoring unit 12 of the control unit 10 of the calculated state of charge of the secondary battery 21 (step S103). The secondary battery state monitoring unit 12 stores the state of charge of the secondary battery packs 20 in a state of charge storage table in the secondary battery state monitoring unit 12 (step S104).

The control power source selecting unit 14 reads the state of charge of the secondary battery packs 20 stored in the state of charge storage table and the lower threshold value of the state of charge from the secondary battery state monitoring unit 12 and selects a secondary battery pack 20 having the lowest state of charge out of the secondary battery packs 20 of which the state of charge is equal to or more than the lower threshold value of the state of charge (step S105). The lower threshold value of the state of charge is a state of charge of the secondary battery 20 which can guarantee the electric energy necessary for the control unit 10 for the operation control of the charging system 1 in a predetermined period of time. The predetermined period of time means, for example, a period of time in which it is windless between sunset and sunrise when the power generating units 30 include the solar power generating unit 30a and the wind power generating unit 30b. This is a period of time in which the power generating units 30 is disabled to generate electric power.

The identification number of the selected secondary battery pack 20 is notified to the operation control unit 13.

Then, the operation control unit 13 performs the operation control so as to supply electric power to the control unit 10 from the secondary battery pack 20 of the notified identification number (step S106). A specific example of the operation control is a control of switching the ON off state to the ON state of the switch 6a of the power supply line connecting the secondary battery pack 20a to the control unit 10 on the basis of the identification number of the specified secondary battery pack 20, for example, when the secondary battery pack 20a is specified to supply power to the control unit 10.

The control unit 10 determines whether a predetermined time interval passes after the step of selecting the secondary battery pack 20 (step S107). When it is determined that the predetermined time interval has passed, the step 105 is performed again and the process of selecting the secondary battery 21 supplying power to the control unit 10 is repeatedly performed. When it is determined in step S107 that the predetermined time interval does not pass, it is determined whether the state of charge of the selected secondary battery 21 is equal to or less than the lower threshold value (step S108).

When the state of charge of the selected secondary battery 21 is equal to or less than the lower threshold value, the step 105 is performed again and the process of selecting the secondary battery pack 20 supplying power to the control unit 10 is repeatedly performed. When it is determined in step S108 that the state of charge of the selected secondary battery pack 20 is not equal to or less than the lower threshold value, the process of determining whether the predetermined time interval passes in step S107 is performed again.

When a new secondary battery pack 20 is selected in the process of selection, a control of switching the switch 6 of the power supply line connecting the secondary battery pack 20 selected before the process to the control unit 10 from the ON state to the OFF state and switching the switch 6 of the power supply line connecting the secondary battery pack 20 newly selected in the process of selection to the control unit 10 from the OFF state to the ON state is performed. Accordingly, the newly-selected secondary battery pack 20 can be changed as the secondary battery pack 20 which is a power source supplying power to the control unit 10.

Figure 5:
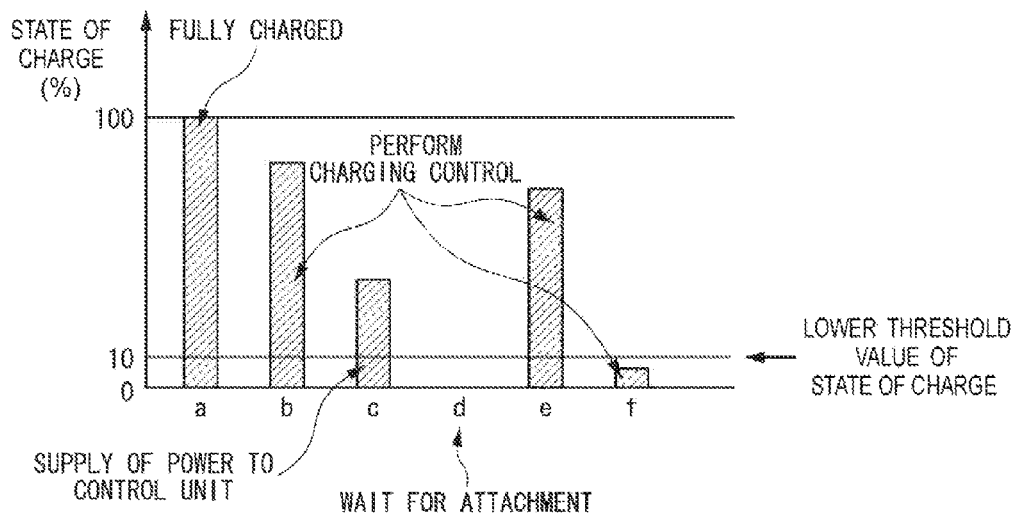
FIG. 5 is a diagram illustrating differences in state of charge among the secondary batteries attached to the charging system 1.

FIG. 5 is a diagram illustrating differences in state of charge among the secondary batteries attached to the charging system 1.

In FIG. 5, the secondary battery pack 20a is fully charged, the secondary battery pack 20e is being removed, the secondary battery pack 20f is charged at the state of charge equal to or less than the lower threshold value, and the secondary battery packs 20b, 20c, and 20f are charged at the state of charge equal to or more than the lower threshold value. In this state, the secondary battery pack 20c having the lowest state of charge out of the secondary battery packs 20 of which the state of charge is equal to or more than the lower threshold value of the state of charge is selected as the secondary battery pack 20 supplying power to the control unit 10 through the use of the above-mentioned processes. When determining that the secondary battery pack 20a is fully charged on the basis of the state of charge (100%) thereof, the operation control unit 13 turns off the switch 5a of the power supply line between the secondary battery pack 20a and the power generating unit 30 so as not to excessively charge and turns off the switch 6a of the power supply line between the secondary battery pack 20a and the control unit 10.

The operation control unit 13 controls the switches 5b, 5e, and 5f of the power supply lines between the secondary battery packs 20b, 20e, and 20f and the power generating units 30 to the ON state and controls the switches 6b, 6e, and 6f of the power supply lines between the secondary battery packs 20b, 20e, and 20f and the control unit 10 to the OFF state, so as to charge the secondary battery packs 20b, 20e, and 20f other than the secondary battery pack 20c selected as the power source out of the secondary battery packs 20b, 20c, 20e, and 20f.

The operation control unit 13 controls the switch 5c of the power supply line between the secondary battery pack 20c selected as the power source and the power generating units 30 and the switch 6c of the power supply line between the secondary battery pack 20c and the control unit 10 to the ON state.

According to these processes, the control unit 10 of the charging system 1 can guarantee electric power for controlling the operation of the charging system 1 in a predetermined period in which it is known that electric power cannot be generated from natural energy, by receiving the supply of power from the secondary battery pack 20 of which the state of charge is equal to or more than the lower threshold of the state of charge. Accordingly, it is possible to provide a charging system 1 which includes the power generating units 30 supplying power generated using natural energy to the removable secondary battery packs 20 and which can stably supply electric power to the control unit 10 controlling the operation of the charging system 1 without an increase in cost.

According to these processes, the secondary battery pack 20 having the lowest state of charge out of the secondary battery packs 20 of which the state of charge is not 100% but equal to or more than the lower threshold value is selected as a power source of the control unit 10 while maintaining a state where the secondary battery pack 20 of which the state of charge is 100% can be detached from the cartridge mechanism and can be used without being discharged. It is possible to provide a charging system 1 which can rapidly increase the number of secondary battery packs 20 with a state of charge of 100% by not using as a power source but charging the secondary battery packs 20 of which the state of charge is higher than the selected secondary battery pack 20, that is, which can be relatively rapidly charged up to a state of charge of 100%.

Second Embodiment

Figure 6:
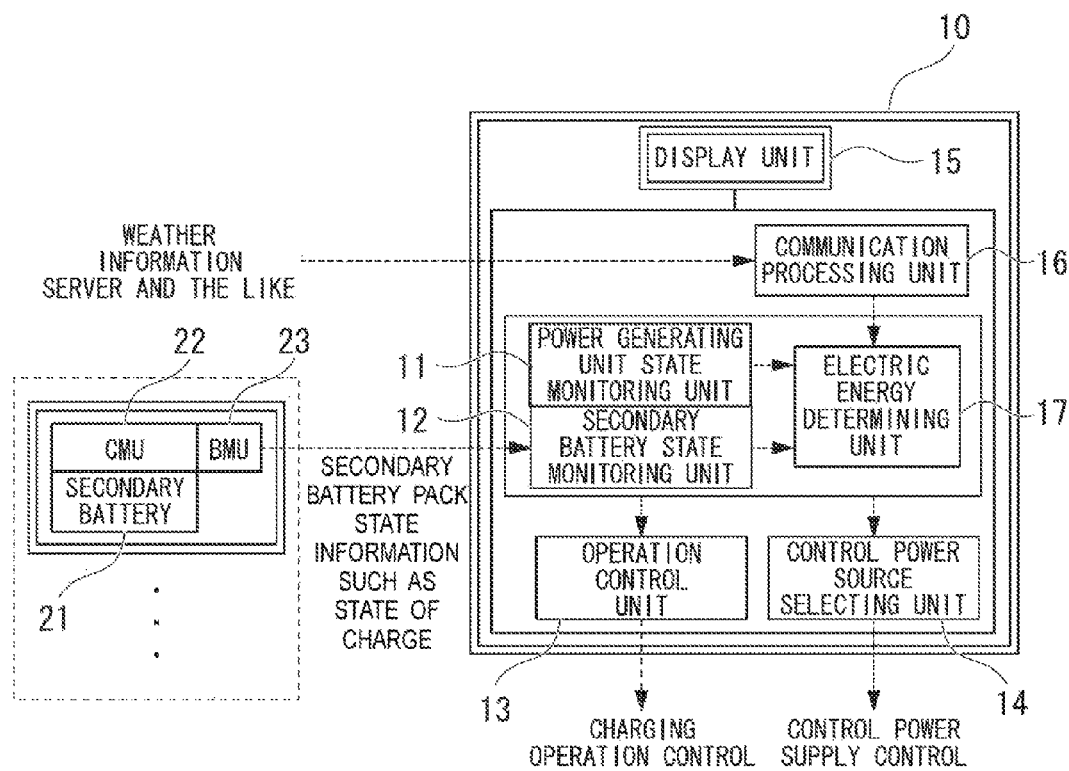
FIG. 6 is a second diagram illustrating the functional blocks of the BMU.

FIG. 6 is a second diagram illustrating functional blocks of the control unit 10. FIG. 7 is a second diagram illustrating the flow of processes in the charging system 1. The control unit 10 may select the secondary battery pack 20 as a power source on the basis of weather information, in addition to the above-mentioned processes. An embodiment in this case will be described below.

First, As shown in FIG. 6, the control unit 10 includes a communication processing unit 16 and an electric power determining unit 17, in addition to the configuration shown in FIG. 3. The communication processing unit 16 receives weather information from another device such as a weather information server. The electric power determining unit 17 determines a secondary battery pack 20 which can supply electric power necessary for the operation control of the charging system 1 on the basis of the weather information, in addition to the configuration shown in FIG. 3.

In the charging system 1 according to the second embodiment of the present invention, the communication processing unit 16 receives weather information (wind condition forecasting data, for example, grid point value (GPV) of meteorological elements such as sea surface, reduced pressure, wind, temperature, relative humidity, cumulative precipitation, ground level pressure, altitude, and upwelling forecasted 51 hours later with meshes of 50 km to 100 km using a meteorological model such as mesoscale spectral model (MSM) by the Meteorological Agency) from the weather information server of a weather information provider or the like (step S201). The electric power determining unit 17 acquires the weather information from the communication processing unit 16 and calculates a generation disabled period on the basis of the weather information (step S202). Regarding the generation disabled period, it is assumed that a forecasted wind speed every hour from sunset to sunrise is stored in the weather information, for example. Then, the electric power determining unit 18 specifies the number of time zones of which the predicted wind speed is stored in the weather information in correlation with 0 in the time zones from sunset to sunrise and calculates the period of time indicated the number of times zones as a period of time in which it is windless, that is, as a generation disabled period $\beta$ (hr). For example, when the forecasted wind speed of three time zones of 10:00 PM, 3:00 AM, and 4:00 AM is 0, the generation disabled period is calculated as $\beta$ (hr)=3 (hr). The power $\alpha$ (W) necessary for the charging system 1 in the time zones from sunset to sunrise which is recorded in advance in the power generating unit state monitoring unit 11 is read, the read power $\alpha$ (W) is multiplied with the generation disabled period $\beta$ ($hr$) to calculate the electric power $\alpha\beta$ (Whr) necessary for the charging system 1 in the time zones from sunset to sunrise, that is, in the generation disabled period (step S203). Then, the electric power determining unit 17 calculates a necessary state of charge in the generation disabled period by (electric power $\alpha\beta$)÷(stored electricity of secondary battery pack 20) (step S204), it is determined whether the state of charge of the respective secondary battery packs 20 is equal to or more than the calculated necessary state of charge, and the secondary battery packs 20 of which the state of charge is equal to or more than the necessary state of charge are specified (step S205). The electric power determining unit 17 notifies the control power source selecting unit 14 of the identification numbers of the secondary battery packs 20 of which the state of charge is equal to or more than the necessary state of charge. Then, the control power source selecting unit 14 reads the state of charge of the secondary battery packs 20 corresponding to the notified identification numbers from the secondary battery state monitoring unit 12 and selects the secondary battery pack 20 having the lowest state of charge out of the secondary battery packs 20 (step S206).

The subsequent processes are similar to the process of step S105 and the processes subsequent thereto in the first embodiment. The operation control unit 13 specifies the secondary battery pack 20 corresponding to the notified identification number as the secondary battery pack 20 to be used to supply power to the control unit 10 and performs the operation control so as to supply power to the control unit 10 from the corresponding secondary battery pack 20 (step S207). The control unit 10 determines whether a predetermined time interval passes after the process of selecting the secondary battery pack 20 (step S208).

When it is determined that the predetermined time interval have passed, the flow of processes goes to step S201 and the process of selecting the secondary battery pack 20 supplying power to the control unit 10 is repeatedly performed. When it is determined in step S208 that the predetermined time interval have not passed, it is determined whether the state of charge of the selected secondary battery pack 20 is equal to or less than the lower threshold value (step S209). When it is determined that the state of charge of the selected secondary battery pack 20 is equal to or less than the lower threshold value, the flow of processes goes to step S201 and the process of selecting the secondary battery pack 20 supplying power to the control unit 10 is repeatedly performed. When it is determined in step S208 that the state of charge of the selected secondary battery 20 is not equal to or less than the lower threshold value, the process of step S208 of determining whether a predetermined time interval passes is performed.

The method of calculating the generation disabled period β varies depending on what power generating units 30 are included in the charging system 1, and the generation disabled period β may be calculated using any weather information.

The weather information may not be acquired from the weather information server or the like, but the weather information such as rainfall, wind speed, or illumination intensity from a database storing information acquired in the past through the use of rain gauges, wind gauges, and illuminometers disposed at desired places and the generation disabled period β may be calculated on the basis of the weather information.

According to the second embodiment, it is possible to select an appropriate secondary battery pack 20 as a secondary battery pack 20 supplying electric power to the control unit 10 performing the operation control of the charging system 1 on the basis of the weather information.

The above-mentioned charging system 1 includes a computer system therein. The above-mentioned process steps are stored in the form of a program in a computer-readable recording medium and are performed by causing the computer to read and execute the program. Here, the computer-readable recording medium means a magnetic disc, a magneto-optical disc, a CD-ROM, a DVD-ROM, a semiconductor memory, or the like. This computer program may be transmitted to a computer through a communication line and the computer having received the computer program may execute the computer program.

The program may be designed to realize some of the above-mentioned functions.

The program may be a program capable of realizing the above-mentioned functions in combination with a program recorded in the computer system, that is, a so-called difference file (difference program).

While exemplary embodiments of the present invention have been described, the present invention is not limited to the exemplary embodiments. The present invention may be subjected to additions, omissions, substitutions, and other modifications of constituents without departing from the concept of the present invention. The present invention is not limited to the above description but is defined by only the appended claims.

INDUSTRIAL APPLICABILITY

The present invention provides the charging system charging plural secondary batteries and more particularly, to the charging system including the power generating unit generating electric power using natural energy, the control unit controlling the operation of the charging system, the plural secondary battery packs being charged with the electric power generated by the power generating unit, and the control power source selecting unit selecting the secondary battery pack as the power source to be used for the operation control of the control unit.

According to the present invention, it is possible to stably supply electric power to the control unit controlling the operation of the charging system without an increase in cost.

DESCRIPTION OF REFERENCE NUMERALS

1: CHARGING SYSTEM
10: CONTROL UNIT
11: POWER GENERATING UNIT STATE MONITORING UNIT
12: SECONDARY BATTERY STATE MONITORING UNIT
13: OPERATION CONTROL UNIT
14: CONTROL POWER SOURCE SELECTING UNIT
15: DISPLAY UNIT
16: COMMUNICATION PROCESSING UNIT
17: ELECTRIC ENERGY DETERMINING UNIT
18: POWER GENERATION DETERMINING UNIT
20: SECONDARY BATTERY PACK
21: SECONDARY BATTERY
22: CMU
23: BMU
30: POWER GENERATING UNIT
40: ELECTRIC POWER LOAD
5, 6: SWITCH

The invention claimed is:
1. A charging system comprising:
a power generating unit generating electric power using natural energy;
a control unit controlling an operation of the charging system;
a plurality of secondary battery packs being charged with the electric power generated by the power generating unit; and
a control power source selecting the secondary battery pack as a power source to be used for the operation control of the control unit, wherein
the control power source selecting unit selects the secondary battery pack as the power source to be used for the operation control on the basis of the state of charges of the plurality of secondary battery packs,
the control power source selecting unit selects the secondary battery pack of which the state of charge is the lowest out of the secondary battery packs of which the state of charge is equal to or more than a lower threshold value of the state of charge as the secondary battery pack of the power source to be used for the operation control,
the control unit determines whether a predetermined time interval passes after the secondary battery pack is selected,
when it is determined that the predetermined time interval has passed, the control power source selecting unit selects again the secondary battery pack,
in the selection after the predetermined time interval has passed, among the plurality of secondary battery packs, of which the state of charge is the lowest out of the secondary battery packs of which the state of charge is equal to or more than a lower threshold value of the state of charge as the secondary battery pack of the power source to be used for the operation control, and when a new secondary battery pack is selected in the selection, the newly selected secondary battery pack is connected to the control unit.

2. The charging system according to claim 1, further comprising:
an electric energy determining unit determining whether electric power calculated on the basis of a generation disabled period of the power generating unit specified on the basis of weather information and electric power to be used for the operation control of the control unit in the generation disabled period can be supplied from each of the secondary battery packs on the basis of the state of charge of the corresponding secondary battery pack,
wherein the control power source selecting unit selects the secondary battery pack that can supply the calculated electric power through the determination as the secondary battery pack of the power source to be used for the operation control.

3. A control method of a charging system, comprising the steps of:
generating electric power using natural energy by a power generating unit of the charging system;
charging a plurality of secondary battery packs of the charging system with the electric power generated by the power generating unit; and
selecting the secondary battery pack as a power source to be used for the operation control of a control unit controlling the operation of the charging system by a control power source selecting unit of the charging system;
selecting the secondary battery pack as the power source to be used for the operation control on the basis of the state of charges of the plurality of secondary battery packs by the control power source selecting unit;
selecting the secondary battery pack of which the state of charge is the lowest out of the secondary battery packs of which the state of charge is equal to or more than a lower threshold value of the state of charge by the control power source selecting unit as the secondary battery pack of the power source to be used for the operation control;
determining whether a predetermined time interval has passed after the secondary battery pack is selected by the control unit;
selecting again the secondary battery pack by the control power source selecting unit when the control power source selecting unit determines that the predetermined time interval has passed, wherein
in the selection step that is performed after the predetermined time interval has passed, among the plurality of secondary battery packs, of which the state of charge is the lowest out of the secondary battery packs of which the state of charge is equal to or more than a lower threshold value of the state of charge is selected as the secondary battery pack of the power source to be used for the operation control; and
when a new secondary battery pack is selected in the selection step, connecting the newly selected secondary battery pack to the control unit.

4. A non-transitory computer-readable medium with an executable program stored thereon, wherein the program causes a control unit to perform the steps of:
generating electric power using natural energy by a power generating unit of the charging system;
charging a plurality of secondary battery packs of the charging system with the electric power generated by the power generating unit; and
selecting the secondary battery pack as a power source to be used for the operation control of a control unit controlling the operation of the charging system by a control power source selecting unit of the charging system;
selecting the secondary battery pack as the power source to be used for the operation control on the basis of the state of charges of the plurality of secondary battery packs by the control power source selecting unit;
selecting the secondary battery pack of which the state of charge is the lowest out of the secondary battery packs of which the state of charge is equal to or more than a lower threshold value of the state of charge by the control power source selecting unit as the secondary battery pack of the power source to be used for the operation control;
determining whether a predetermined time interval has passed after the secondary battery pack is selected by the control unit;
selecting again the secondary battery pack by the control power source selecting unit when the control power source selecting unit determines that the predetermined time interval has passed, wherein
in the selection step that is performed after the predetermined time interval has passed, among the plurality of secondary battery packs, of which the state of charge is the lowest out of the secondary battery packs of which the state of charge is equal to or more than a lower threshold value of the state of charge is selected as the secondary battery pack of the power source to be used for the operation control; and
when a new secondary battery pack is selected in the selection step, connecting the newly selected secondary battery pack to the control unit.

5. The charging system according to claim 1, further comprising:
an electric energy determining unit determining whether electric power calculated on the basis of a generation disabled period of the power generating unit specified on the basis of weather information and electric power to be used for the operation control of the control unit in the generation disabled period can be supplied from each of the secondary battery packs on the basis of the state of charge of the corresponding secondary battery pack,
wherein the control power source selecting unit selects the secondary battery pack that can supply the calculated electric power through the determination as the secondary battery pack of the power source to be used for the operation control.

* * * * *